United States Patent
Gabriel et al.

(10) Patent No.: US 9,551,856 B2
(45) Date of Patent: Jan. 24, 2017

(54) MEMS-RELEASED CURVED IMAGE SENSOR

(71) Applicant: Google Inc., Mountain View, CA (US)

(72) Inventors: Kaigham Jacob Gabriel, Pittsburgh, PA (US); Philip Sean Stetson, Wexford, PA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 14/314,613

(22) Filed: Jun. 25, 2014

(65) Prior Publication Data

US 2015/0334300 A1 Nov. 19, 2015

Related U.S. Application Data

(60) Provisional application No. 62/000,433, filed on May 19, 2014.

(51) Int. Cl.

| | |
|---|---|
| *G02B 9/02* | (2006.01) |
| *H04N 5/232* | (2006.01) |
| *H04N 5/247* | (2006.01) |
| *H04N 5/225* | (2006.01) |
| *H04N 5/374* | (2011.01) |
| *H04N 5/335* | (2011.01) |
| *H04N 5/369* | (2011.01) |

(52) U.S. Cl.
CPC .............. *G02B 9/02* (2013.01); *H04N 5/2253* (2013.01); *H04N 5/2254* (2013.01); *H04N 5/23238* (2013.01); *H04N 5/247* (2013.01); *H04N 5/335* (2013.01); *H04N 5/369* (2013.01); *H04N 5/3742* (2013.01); *G02B 2207/101* (2013.01)

(58) Field of Classification Search
CPC .................................................. H01L 27/14618
See application file for complete search history.

(56) References Cited

U.S. PATENT DOCUMENTS

| | | | | |
|---|---|---|---|---|
| 6,526,160 B1* | 2/2003 | Ito | ...................... | G06K 9/00604 382/117 |
| 8,654,215 B2* | 2/2014 | Sutton | ................ | H01L 27/14605 348/240.2 |
| 8,932,894 B2* | 1/2015 | Christophersen | . | H01L 31/02240 257/429 |
| 2001/0020671 A1* | 9/2001 | Ansorge | ............ | H01L 27/14603 250/208.1 |
| 2008/0151089 A1* | 6/2008 | Street | ................ | H01L 27/14601 348/308 |
| 2009/0115875 A1* | 5/2009 | Choi | .................. | H01L 27/14618 348/294 |

(Continued)

*Primary Examiner* — James Hannett
(74) *Attorney, Agent, or Firm* — Wolfe-SBMC (57) ABSTRACT

This document describes MEMS-released curved image sensors capable of sensing light from a monocentric lens. This MEMS-released curved image sensor receives light focused on a curved focal surface by releasing a photodetector side of a computing and sensing wafer, such as a Complementary Metal-Oxide Semiconductor (CMOS) sensor. This releasing is effective to allow the photodetector side to conform to the curved focal surface of the monocentric lens. By so doing, the wider field of view, smaller size, and often smaller weight of monocentric lenses can be gained while using generally high-quality, low-cost computing and sensing wafers by processing these wafers to give them a curved surface at which to sense light from a monocentric lens.

20 Claims, 10 Drawing Sheets

(56) References Cited

U.S. PATENT DOCUMENTS

2014/0303452 A1* 10/2014 Ghaffari ............ H01L 27/14618
600/301
2015/0207990 A1* 7/2015 Ford .................... H04N 5/2254
348/262

* cited by examiner

MEMS-RELEASED CURVED IMAGE SENSOR

PRIORITY APPLICATION

This application claims priority under 35 U.S.C. §119(e) to U.S. Provisional Patent Application No. 62/000,433, entitled "MEMS-Released Curved Image Sensor" and filed on May 19, 2014, the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Conventional imaging devices use multi-lens assemblies that provide a flat focal plane. These multi-lens assemblies enable use of planar image devices, such as a silicon chip having an integrated array of light-sensitive photodetectors. These conventional imaging devices, however, have various limitations, such as poor resolution at edges of the flat focal plane and a need for highly precise lens alignment in the assembly. The dimensions of the multi-lens assemblies also result in a compromise between image quality and thickness of computing devices that have the imaging device, such as mobile phones, smaller cameras, and computing spectacles. In effect, multi-lens assemblies limit how thin or small a device can be when high-quality imaging is desired.

In contrast, monocentric lenses are capable of providing higher optical resolution across a wide field of view, often at smaller sizes and costs that multi-lens assemblies. Monocentric lenses, however, produce a curved focal surface rather than the flat focal plane common to multi-lens assemblies. Because of this, high-quality and low-cost planar computing and sensing chips cannot readily be used with monocentric lenses.

BRIEF DESCRIPTION OF THE DRAWINGS

Apparatuses of and techniques using a MEMS-released curved image sensor are described with reference to the following drawings. The same numbers are used throughout the drawings to reference like features and components.

DETAILED DESCRIPTION

This document describes a MEMS-released curved image sensor capable of sensing light from a monocentric lens. This MEMS-released curved image sensor receives light focused on a curved focal surface through a curved photodetector surface. This curved photodetector surface is enabled by releasing a photodetector side of a computing and sensing wafer, such as a Complementary Metal-Oxide Semiconductor (CMOS) sensor. This releasing allows the photodetector side to conform to the curved focal surface of the monocentric lens. By so doing, the wider field of view, smaller size, and often smaller weight of monocentric lenses can be gained while using generally high-quality, low-cost computing and sensing wafers.

The following discussion describes an operating environment, example MEMS-released curved image sensors for curved focal surfaces, followed by techniques that may be employed in this environment, and ending with an example electronic device.

Example Environment

Figure 1:
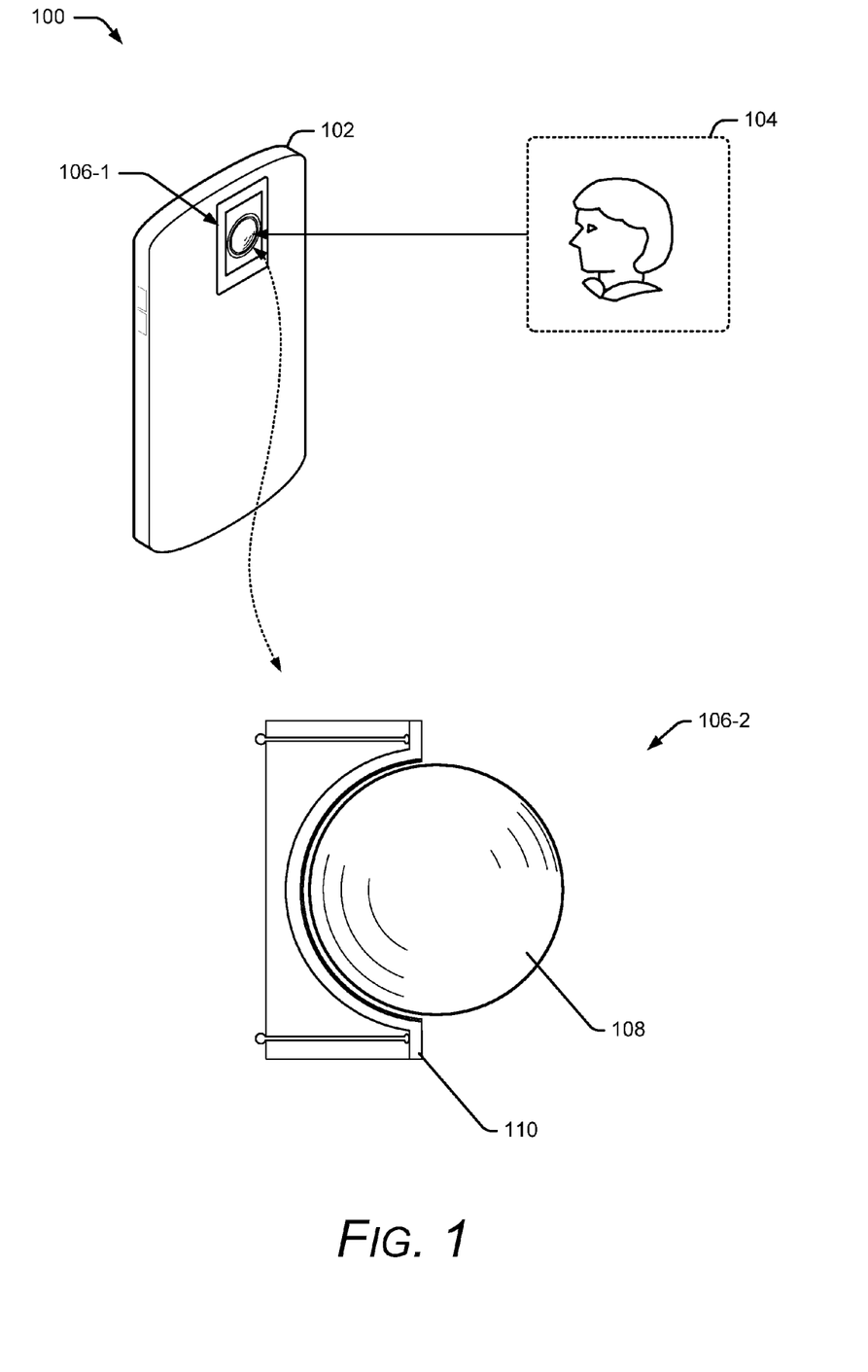
FIG. 1 illustrates an example environment in which a MEMS-released curved image sensor can be enabled.

FIG. 1 illustrates an example environment 100 in which a MEMS-released curved image sensor can be embodied. Example environment 100 includes a computing device 102 capturing images of a scene 104. Computing device 102 includes an imaging device 106 shown in part at 106-1 and in detail at 106-2. Imaging device 106 includes monocentric lens 108 and MEMS-released curved image sensor 110. Ways in which monocentric lens 108 operates are described in FIG. 2, followed by a detailed illustration of MEMS-released curved image sensor 110 in FIG. 3.

Figure 2:
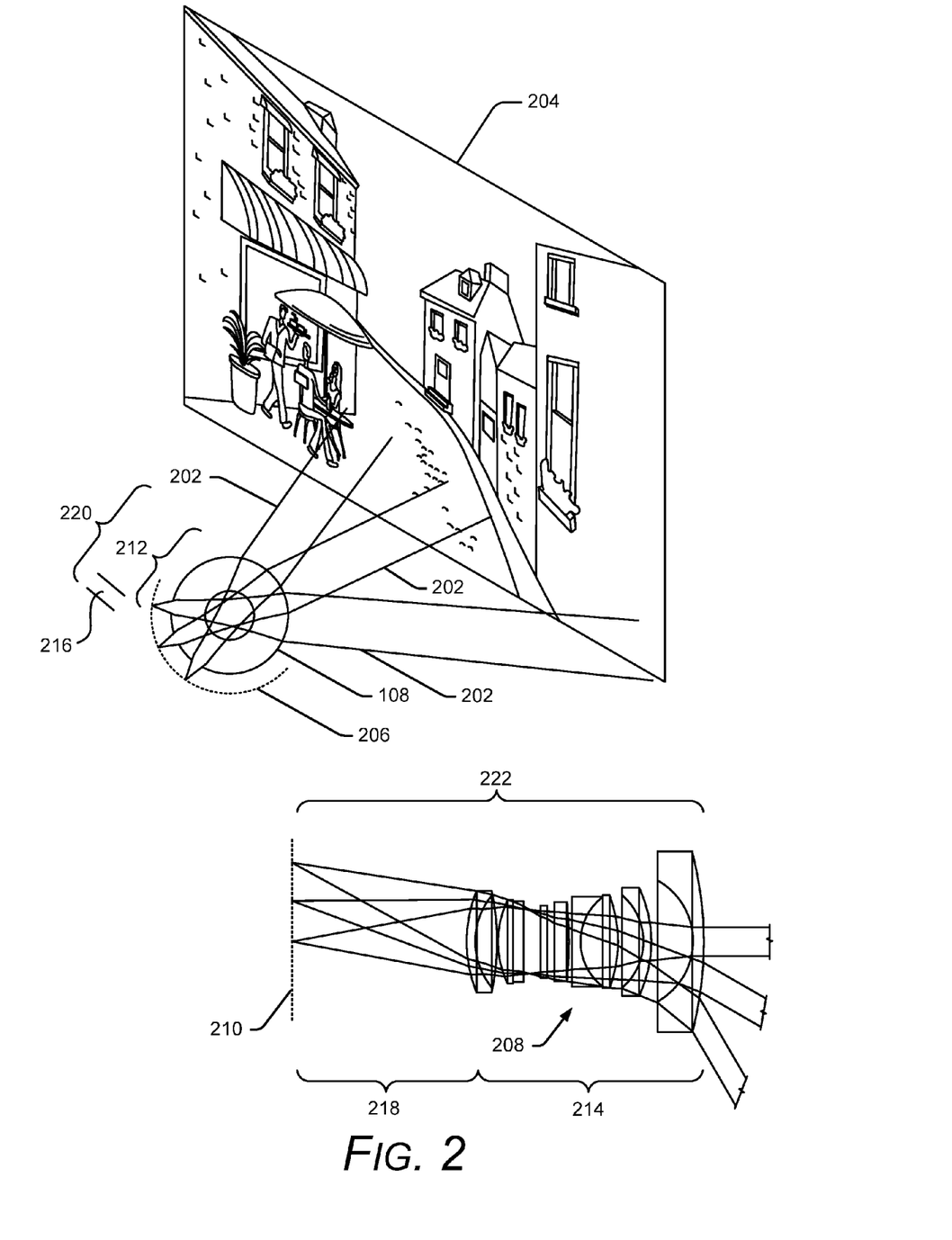
FIG. 2 illustrates optical properties of a monocentric lens, showing light from a scene captured by the monocentric lens and, for contrast, a traditional multi-lens assembly having multiple aspherical lenses.

FIG. 2 illustrates optical properties of monocentric lens 108, which shows light 202 from a scene 204 captured by monocentric lens 108. Monocentric lens 108 focuses this light 202, and thus scene 204, to a curved focal surface 206. Contrast this with multi-lens assembly 208 focusing to a flat focal plane 210. Multi-lens assembly 208 is shown with multiple aspherical lenses, but may include a mix of lenses and other optical elements. While not to scale, multi-lens assembly 208 often requires a substantially larger Z-height (in this example the assembly length along the optical axis) than a monocentric lens. Z-heights not only include focal-path dimensions of the lens or lens assembly, shown at monocentric-lens focal path 212 and multi-lens-assembly focal path 214, but also back-focal distance, shown here as monocentric-lens back-focal distance 216 and multi-lens-assembly back-focal distance 218. Thus, monocentric-lens Z-height 220, assuming similar image quality, is substantially smaller than multi-lens-assembly Z-height 222. Note also the complexity in making, configuring, and aligning the seven lens elements of multi-lens assembly 208 and that monocentric lens 108 may also have a field of view (e.g., 120 to 180 degrees) that is superior to that of multi-lens assembly 208.

While the example shown of monocentric lens 108 is that of a singular, spherical lens, multiple lenses or a non-spherical lens is permitted. Monocentric lenses may have a lens surface that has a common center but need not be fully spherical. A common center may include a section of a sphere, for example. Further, multiple monocentric lenses can be used, which, while it may increase Z-height, the precision needed to align monocentric lenses can be lower than aspherical lenses and fewer lenses may be used than in a multi-lens assembly that produces a flat focal plane.

Figure 3:
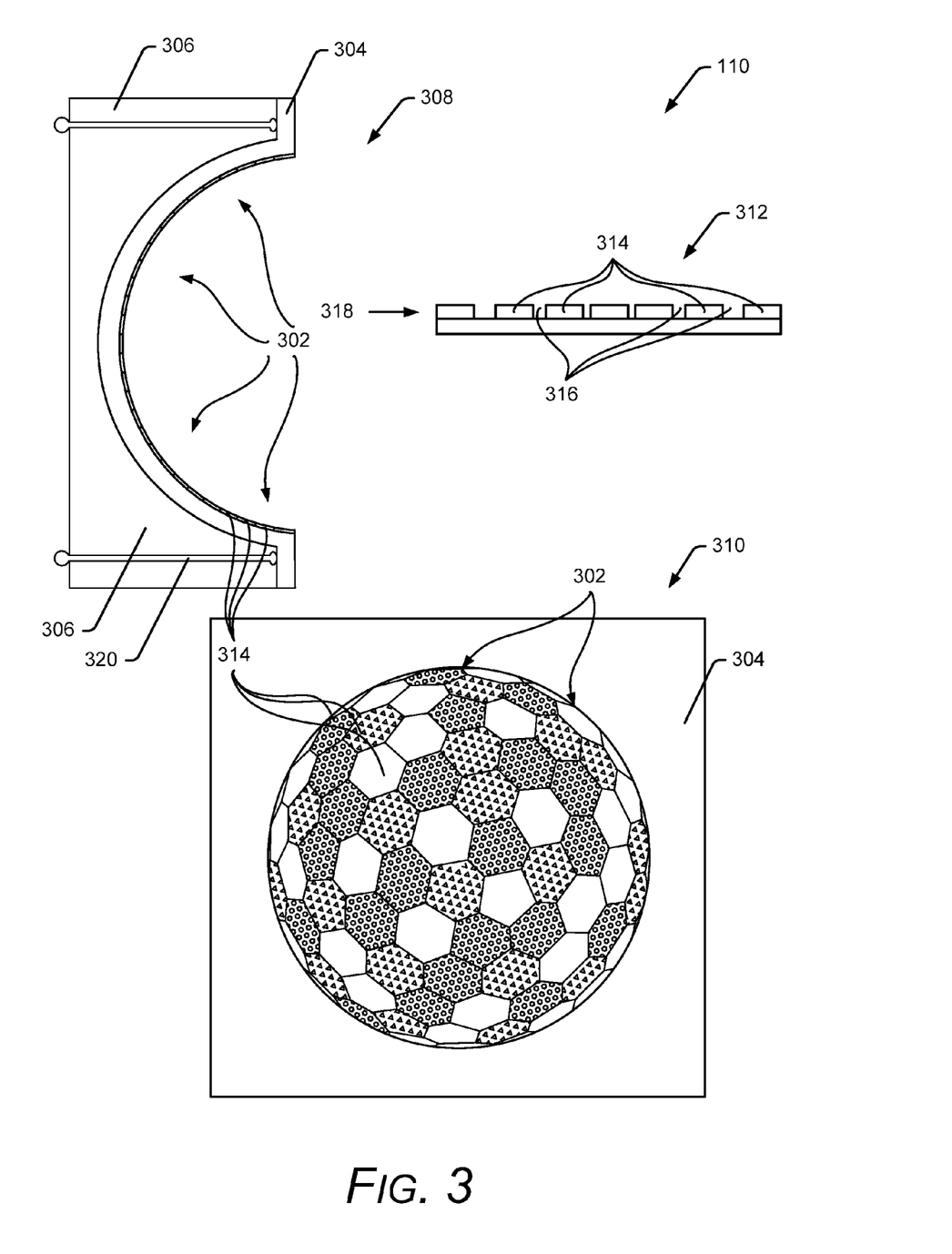
FIG. 3 illustrates the MEMS-released curved image sensor of FIG. 1 in greater detail, including a curved photodetector surface and released interior layer.

FIG. 3 illustrates MEMS-released curved image sensor 110 of FIG. 1 in greater detail. MEMS-released curved image sensor 110 includes a curved photodetector surface 302, a curved circuit 304 physically integral with curved photodetector surface 302, and a support substrate 306. MEMS-released curved image sensor 110 is shown in cross-section view 308 and in plan view 310. Plan view 310 is from a perspective at which an image is captured but without a lens being shown (looking down on curved photodetector surface 302).

Curved photodetector surface 302 is concave and, at the concavity, capable of sensing light of a curved focal surface and providing electric signals in response to sensing the light. These electric signals can be received at curved circuit 304, which may then provide the electrical signals or process the electric signals to provide data associated with the electric signals. In either case, the provided data or signals is effective to enable production of an image associated with the light that is sensed via the monocentric lens.

As noted above, curved photodetector surface 302 and curved circuit 304 can be integrated within a single silicon wafer, such as a Complementary Metal-Oxide Silicon (CMOS) chip. In some cases, this silicon wafer is a backside-illuminated CMOS with curved photodetector surface 302 being on the backside of the wafer and curved circuit 304 being on a front side of the wafer. While not required, processing of planar chips can be less complicated, or expensive, or allow for higher quality than curved chips. These techniques permit use of planar chips.

Curved photodetector surface 302 includes a released interior layer, such as a released photodetector surface, which is shown prior to conforming to a concave shape, generally 312. Planar released photodetector surface 312 shows a small portion, in cross section, and expanded to illustrate photodetectors 314 and released regions 316 of interior 318. Photodetectors 314 are also shown in cross-section view 308 and plan view 310.

Various manners can be used to form released regions 316 of interior 318. These include building up sections in which photodetectors 314 of curved photodetector surface 302 are embodied. Other manners form released interior 318 through etching of spaces, furrows, or voids such as to remove a material from this layer (e.g., silicon) in which photodetectors 314 reside.

Figure 4:
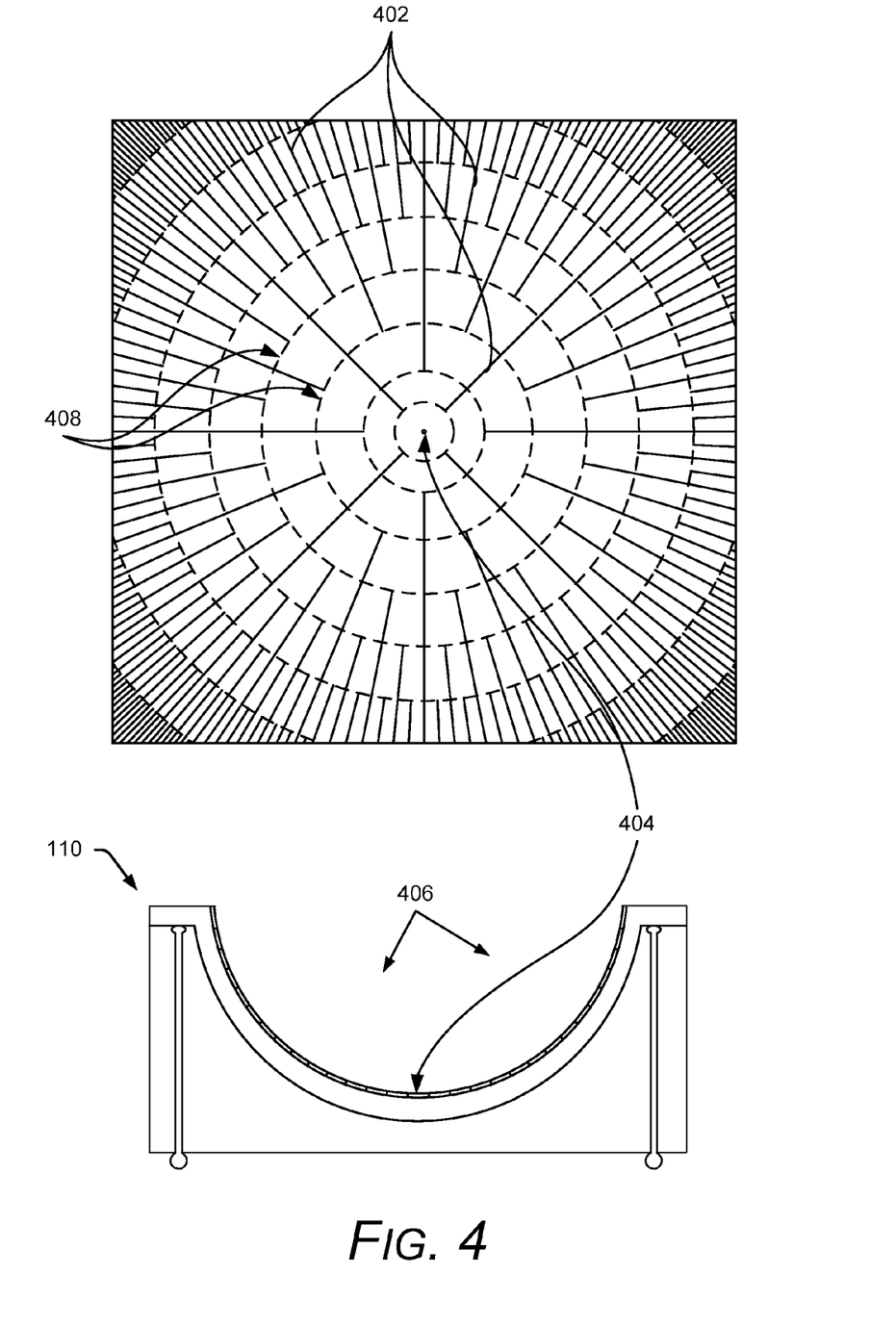
FIG. 4 illustrates etched furrows extending radially from a center of a later-created concavity with a higher density of furrows as distance from the center increases.

By way of example, consider FIG. 4, which illustrates etched furrows 402 extending radially from a center 404 of a later-created concavity 406 (shown in cross section of MEMS-released curved image sensor 110) with a higher density of furrows as distance from center 404 increases. Dashed-line circles 408 show areas at which a new furrow begins. Note that more and more material is removed as the distance from the center increases, which permits greater conformity as greater conformity is needed to apply a planar shape to a curved shape.

Figure 5:
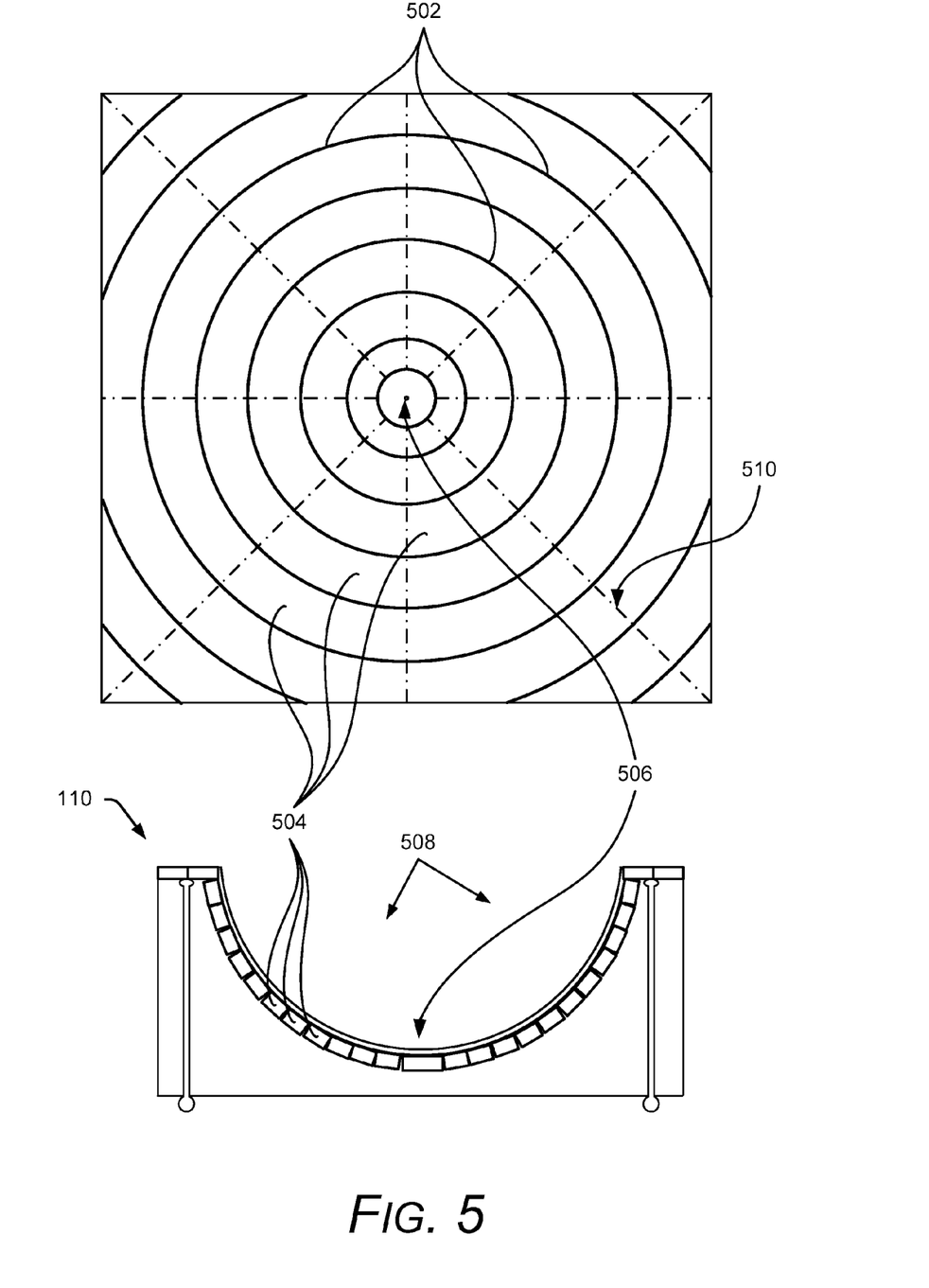
FIG. 5 illustrates etched furrows spaced to create substantially concentric rings centered at a center of a later-created concavity.

Another example is illustrated in FIG. 5, which shows etched furrows 502 spaced to create substantially concentric rings 504 centered at a center 506 of a later-created concavity 508. Note that here etched furrows 502 may also etch through most or all other layers, such as material in which curved circuit 304 is embodied (but not necessarily electrical conduits of curved circuit 304). In some cases, adjacent substantially concentric rings 504 remain integrated through a spring-like material 510 (shown with dot-dash lines). This material can be fabricated prior to etching or after, and be in or on a surface (e.g., the non-sensor surface). If fabricated prior to etching, the material for spring-like material 510 is not the material being etched (e.g., not the material in which photodetectors of the curved photodetector surface or the circuit are embodied). Note that many more etched furrows 502 (and other releases described herein) can be performed, the number shown is for visual clarity, and not representative of actual numbers.

Figure 6:
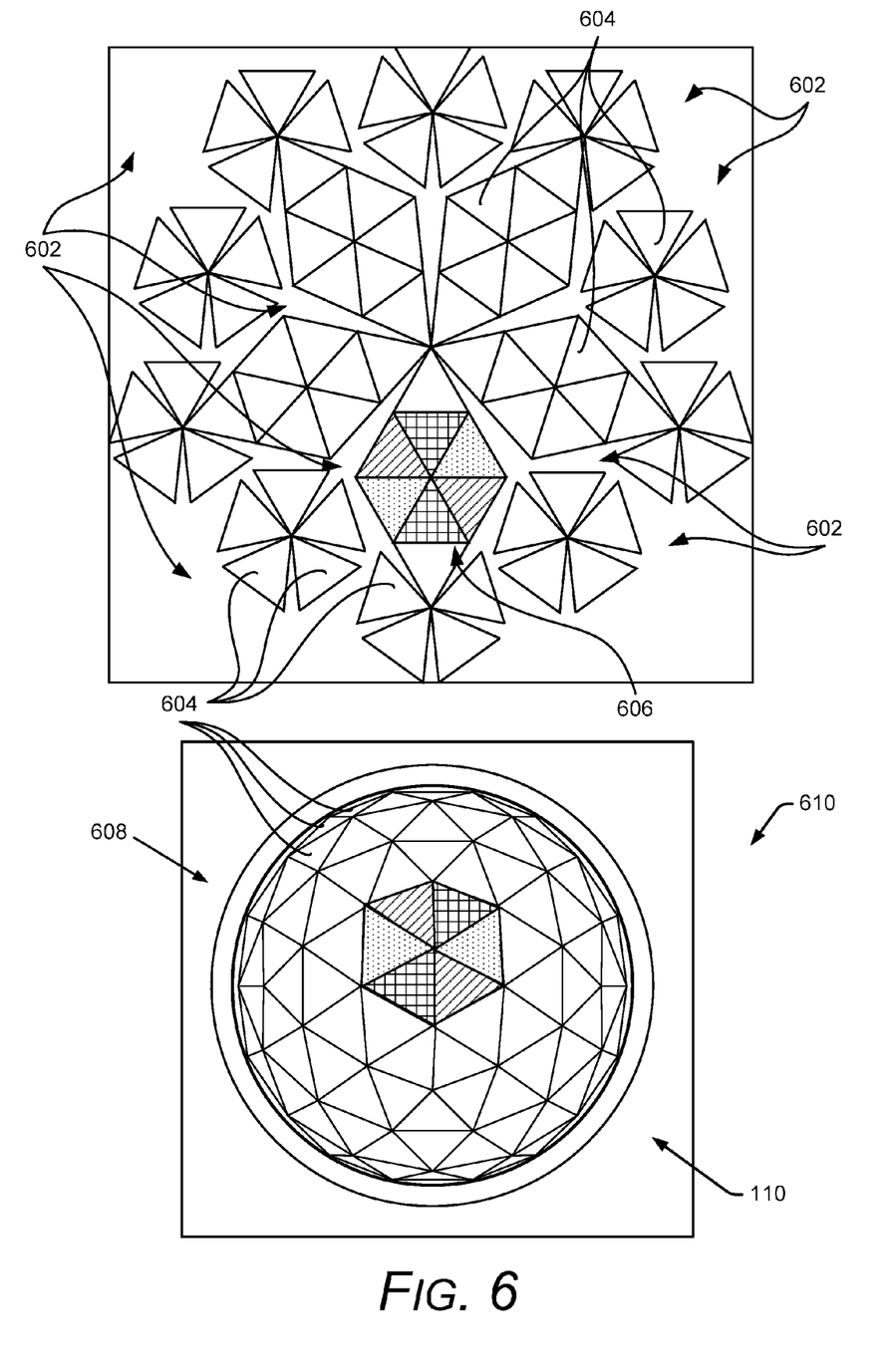
FIG. 6 illustrates etched spaces and, in the non-etched spaces, regions having photodetectors. These regions can be of various shapes such that when conformed to a concave shape the shapes fit together.

Another example is illustrated in FIG. 6, which shows etched spaces 602 and, in the non-etched spaces, regions 604 having photodetectors 314 (six shown, enlarged for clarity, at 606). These regions 604 can be of various shapes such that when conformed to a concave shape the shapes fit together. Examples are polygons, such as a majority of the regions being hexagons (as shown in FIG. 3) or triangles as shown in FIG. 6. These polygons of regions 604, when conformed to a hemisphere, fit together to create an inverted section of a polyhedron 608. Note that regions 604 appear, when shown in plan view 610 of MEMS-released curved image sensor 110, to be smaller at the edges. This is caused by the angle of view and not the size of regions 604.

Returning to FIG. 3, curved photodetector surface 302 includes photodetectors 314, which are in curved photodetector surface 302, and are capable of sensing light and providing electric signals in response. This illustration shows resolutions of photodetectors 314 with hexagons of a particular size, which are here assumed to be pixels. The number of photodetectors 314 shown in FIG. 3 is reduced for visual clarity, as showing millions of pixels is not possible for this type of illustration. The varying shades or hatchings illustrated for photodetectors 314 indicate sensitivity to different wavelengths of lights, such as red, green, or blue.

Photodetectors 314 may include an array of photodetectors, which can be fabricated or deposited in or on silicon or non-silicon. Thus, photodetectors 314 can include silicon-doped photodetective regions of a silicon wafer. Other examples include an organic light-sensing material having amorphous sensing areas capable of spatially-coherently detecting light and converting the light into the electric signals. This organic material may comprise one or multiple layers, such as three layers that are each sensitive to a light of a different wavelength. Note that some organic light-sensing materials generate a charge (e.g., an electric signal) sufficient for an electrical conductor to carry the charge (e.g., sense) without neighboring conductors doing the same, as some organic materials have a high conductivity in a perpendicular direction (e.g., a Z-direction or direction perpendicular to curved photodetector surface 302) and a low conductivity in a parallel direction (e.g., a X or Y direction or direction parallel to curved photodetector surface 302). Amorphous areas are approximated by hexagons shown at photodetectors 314, though this is for illustration purposes only.

Still other types of photodetectors 314 can be on or in curved photodetector surface 302, whether prior to after etching, including quantum-dot photodetectors. Quantum-dot photodetectors produce an electronic signal when excited by visible (and in some cases non-visible) light. They are generally a nanocrystal made of a semiconductor material and which is small enough to exhibit quantum characteristics. Quantum-dot photodetectors can be disposed on curved photodetector surface 302 as groups of dots or layers of dots, each of the groups or layers acting as one or more of photodetectors 314. Photodetectors 314 may also include photodetective materials sensitive to the infrared spectrum, such as indium gallium arsenide (InGaAs), indium arsenide or monoarsenide (InAs, a semiconductor), or indium antimonide (InSb). Some quantum dots can be formed from a monolayer of indium arsenide on indium phosphide or gallium arsenide, or from a layer of indium gallium arsenide. Also, indium antimonide can be grown from organometallic compounds using chemical vapor deposition (e.g., matalorganic vapor-phase epitaxy, deposited on curved photodetector surface 302). Infrared-spectrum sensitivity can be used for thermal imaging and improved low-light imaging, alone or in combination with photodetectors sensitive to visible light.

Curved circuit 304 can be released, though this is not required. In some cases a layer in which the curved circuit resides includes cracks, the cracks enabling the MEMS-released curved image sensor to conform to the curved focal surface. These cracks can be planned for (or caused) by providing some etching in particular areas as needed. Cracks permitted or desired to be formed at these etched lines or regions can reduce stress or permit conformity to a desired curved focal surface at regions in which cracks will not damage functioning of the MEMS-released curved image sensor.

Support substrate 306 can provide sufficient support to maintain a concavity of curved photodetector surface 302 and curved circuit 304, and includes electric vias 320 through which curved circuit 304 provides electric signals or data associated with the electric signals received from photodetectors 314. Alternately or additionally, substrate 306 (or curved circuit 304) may comprise a Z-conductive material or substrate that conducts charge (e.g., generated by the photodetectors) without neighboring material doing the same. Thus, the Z conductive material may be highly conductivity in a perpendicular direction (e.g., a Z direction or direction perpendicular to curved photodetector surface 302) and not conductive in a parallel direction (e.g., an X or Y direction or direction parallel to curved photodetector surface 302).

Monocentric lens 108 (not shown in FIG. 3) can also or instead maintain a concavity of curved photodetector surface 302, such as when monocentric lens 108 is used to create the concavity. Monocentric lens 108 may then remain, forming much of the eventual sensor used to capture images. In many cases, curved photodetector surface 302 conforms to some section of a sphere, which in turn corresponds to a surface of monocentric lens 108, and, as shown in FIG. 1, surrounds a portion of monocentric lens 108.

Figure 7:
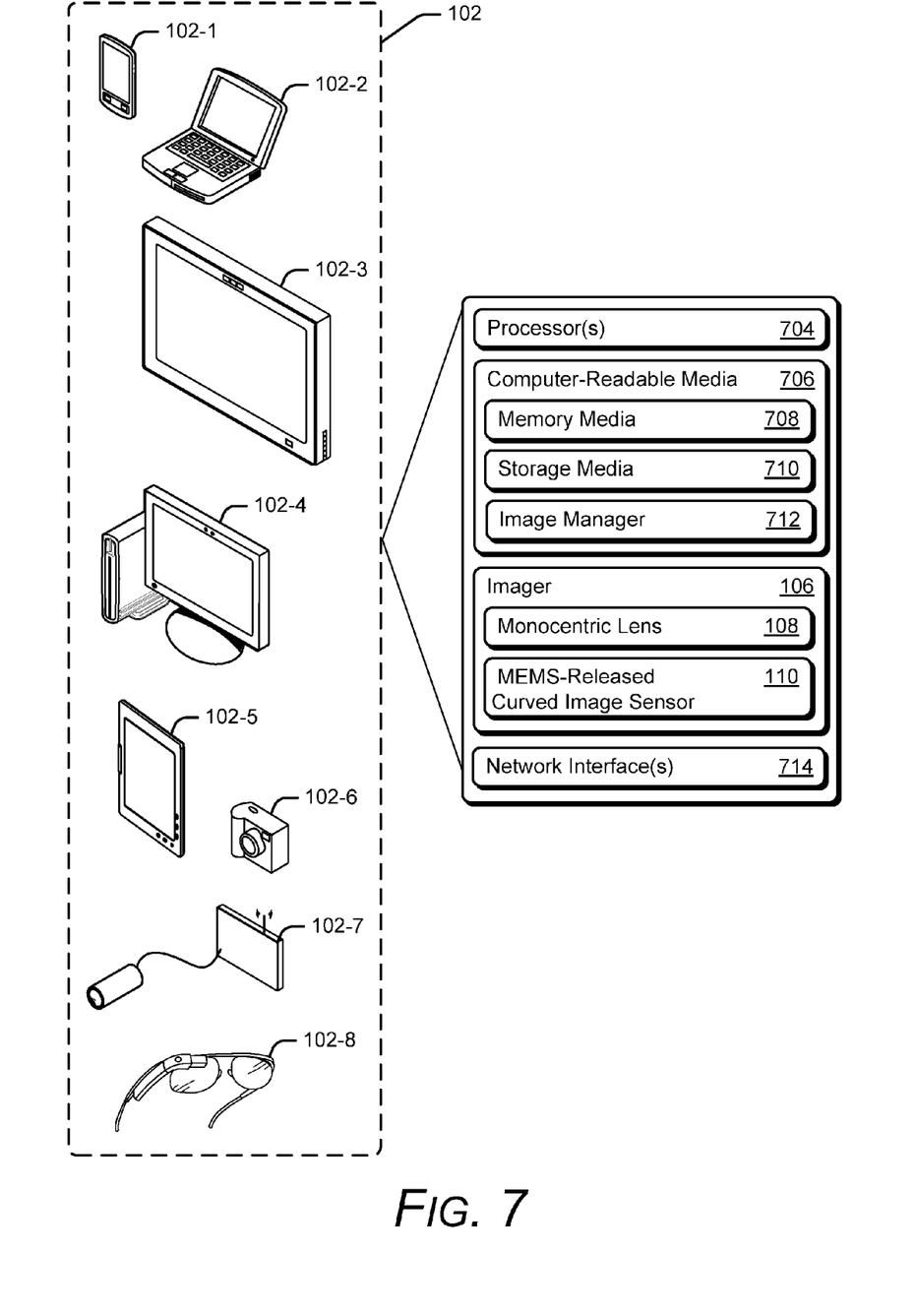
FIG. 7 illustrates the computing device of FIG. 1 in greater detail.

Having generally described MEMS-released curved image sensors for curved focal surfaces and imagers, this discussion now turns to FIG. 7, which illustrates computing device 102 of FIG. 1 in greater detail. Computing device 102 is illustrated with various non-limiting example devices: smartphone 102-1, laptop 102-2, television 102-3, desktop 102-4, tablet 102-5, camera 102-6, security system 102-7, and computing spectacles 102-8. Computing device 102 includes processor(s) 704 and computer-readable media 706, which includes memory media 708 and storage media 710. Applications and/or an operating system (not shown) embodied as computer-readable instructions on computer-readable memory 706 can be executed by processor(s) 704 to provide some of the functionalities described herein. Computer-readable media 706 also includes image manager 712 (described below). As noted in FIG. 1, computing device 102 includes imager 106, which in turn includes monocentric lens 108 and MEMS-released curved image sensor 110.

Computing device 102 may also include network interface(s) 714 for communicating data over wired, wireless, or optical networks. By way of example and not limitation, network interface 714 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Example Method

Figure 8:
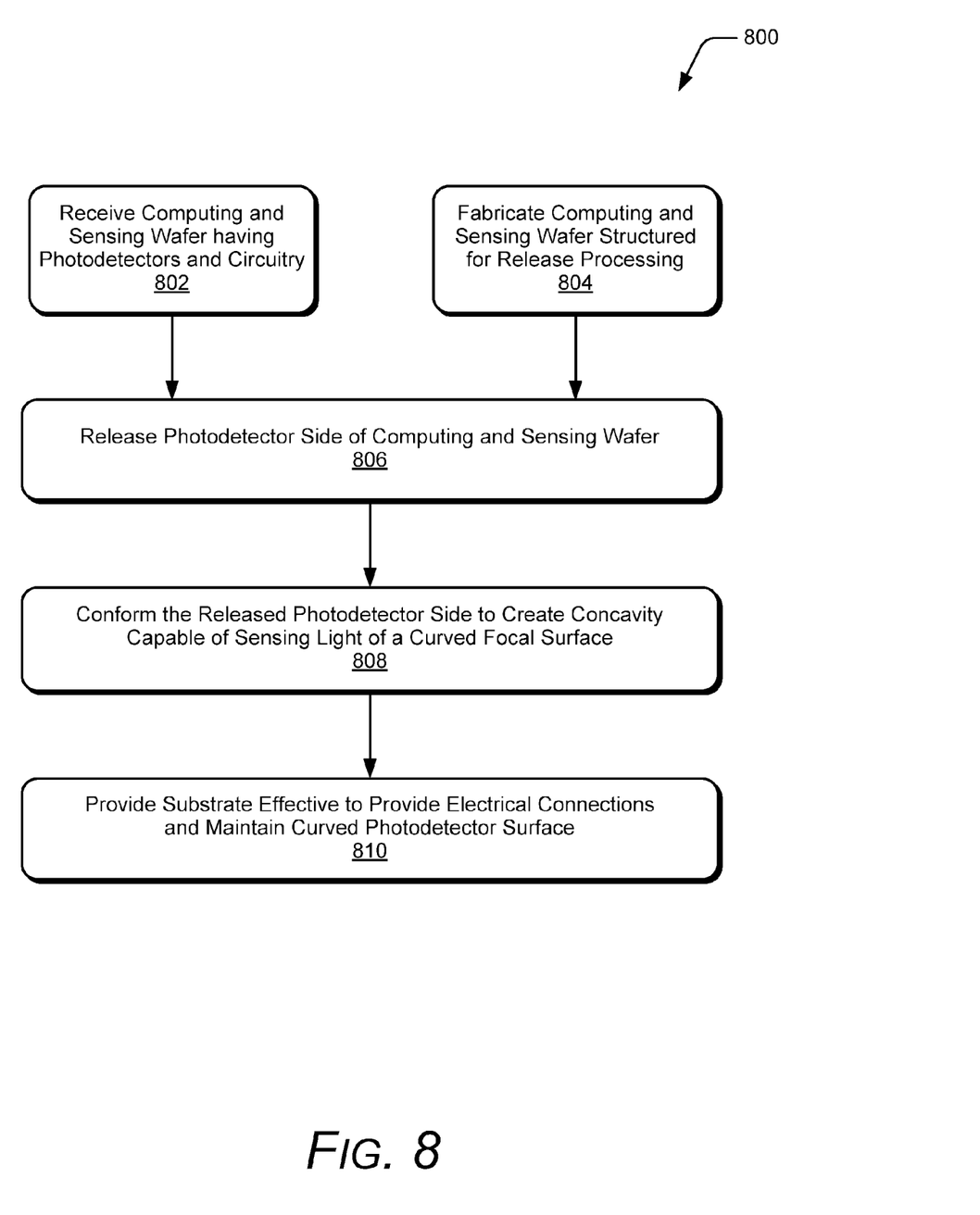
FIG. 8 illustrates example methods for fabricating a MEMS-released curved image sensor.

The following discussion describes a method by which a MEMS-released curved image sensor can be fabricated. This method can be implemented utilizing the previously described environment and example photodetectors, substrates, and circuits, such as those shown in FIGS. 1-7. Aspects of this method is illustrated in FIG. 8, which is shown as operations performed by one or more entities.

At 802, a computing and sensing wafer having photodetectors and circuitry is received. As noted above, a high-quality and relatively inexpensive CMOS sensor (e.g., one configured to sense light using a photodetector array and process electric signals) can be used.

Alternatively, at 804, a computing and sensing wafer structured for release processing is fabricated. This wafer may include some blank areas not having photodetectors 314 that may otherwise be removed from a more-standard wafer, have circuitry designed for photodetector surface 302 after release and conformity to a curved surface for use with a monocentric lens.

In either case, various types of chips having sensors in one area and a circuit can be used, including photodetectors noted above. Also, while processing a planar wafer can be easier, perfect planar areas are not required. A wafer may include a plane or multiple planes, such as a roughly planar surface having steps, processing artifacts, structures, and so forth may be used.

At 806, a photodetector side of a computing and sensing wafer is released. As noted, various manners may be used, including those at a micro electrical mechanical system (MEMS) scale, through etching, whether wet (liquid-based) or dry (generally plasma-based). Further, etching may include use of a photo-resistive mask created using photolithography.

The result of releasing the photodetector side of the wafer is shown in FIGS. 1, 3, 4, 5, and 6, and includes examples where releasing creates polygons that, on conforming to a spherical concavity, create an inverted polyhedron. Still others can be released, such as through etching or in some cases building up of sensing material, through radially arranged furrows, concentric furrows for creating concentric rings, even those etching through both the photodetector surface and circuit, and so forth.

Multiple MEMS-released curved image sensors can be used to sense a single curved focal surface. In some cases three or more curved image sensors are used, in some cases due to insufficient flexibility even after releasing, to conform to a desired curved focal shape. In such cases the concavity, and thus the shape of the curved photodetector surface, conforms to a portion of the curved focal shape. An example of this can be visualized using FIG. 3, with each of the hexagons shown assumed to be a moderately concave photodetector surface associated with a different computing and sensing wafer. While shown with numerous hexagons, fewer than these may also be used to create MEMS-released curved image sensor.

At 808, the released photodetector side of the computing and sensing silicon wafer is conformed to create a concavity capable of sensing light of a curved focal surface of a monocentric lens through photodetectors at the concavity of the released photodetector side. The conforming can be through use of a removable structure or even the monocentric lens intended for use in imager 106. Further, this conforming can cause cracks or breaks in some cases, which can be planned for through use of etching or other manners on a circuit side of a wafer.

At 810, a support substrate is provided. This support substrate can maintain the curved photodetector surface and/or provide electric connections as noted above.

Returning to the example of FIG. 2, image manager 712 can receive, through imager 106 having MEMS-released curved image sensor 110 and monocentric lens 108, electric signals and provide an image of scene 204. In more detail, light that is received by monocentric lens 108 is focused to a curved focal surface. This light is received at a MEMS-released curved image sensor having photodetectors at a curved photodetector surface. By way of example, assume that light from scene 204 of FIG. 2 is received by monocentric lens 108 of FIGS. 1 and 2.

This received light is converted to electric signals through the photodetectors the curved photodetector surface of the MEMS-released curved image sensor. The curved photodetector surface may be configured in any suitable way, such as including photodetectors that produce electric signals in response to exposure to light of one or more wavelengths. Continuing the ongoing example, the light from scene 204 is focused at curved focal surface 206 and sensed, by photodetectors 314 of FIG. 3, effective to produce electric signals.

These electric signals are received, and in some cases processed by, curved circuit 304 and/or image manager 712. Thus, electric signals corresponding to colors and color intensity are sensed by photodetectors 314 and, with these, an image is constructed. Thus, curved circuit 304, alone or in combination with hardware, firmware, or software elements, constructs an image of scene 104. Image manager 712 of FIG. 7 may process or post-process the electric signals representing the image of scene 104, such as to alter a layout to fit a particular size (e.g., aspect ratio or frame size). If a round scene is captured, for example, image manager 712 may convert the round image to a rectangular image for storage and use. Image manager 712 may also perform post-processing to improve resolution (e.g., for green, green, red, blue photodetectors in which the green photodetectors are also used for sharpness), filtering, and so forth. Curved circuit 304, however, may construct the image with little or no assistance.

Figure 9:
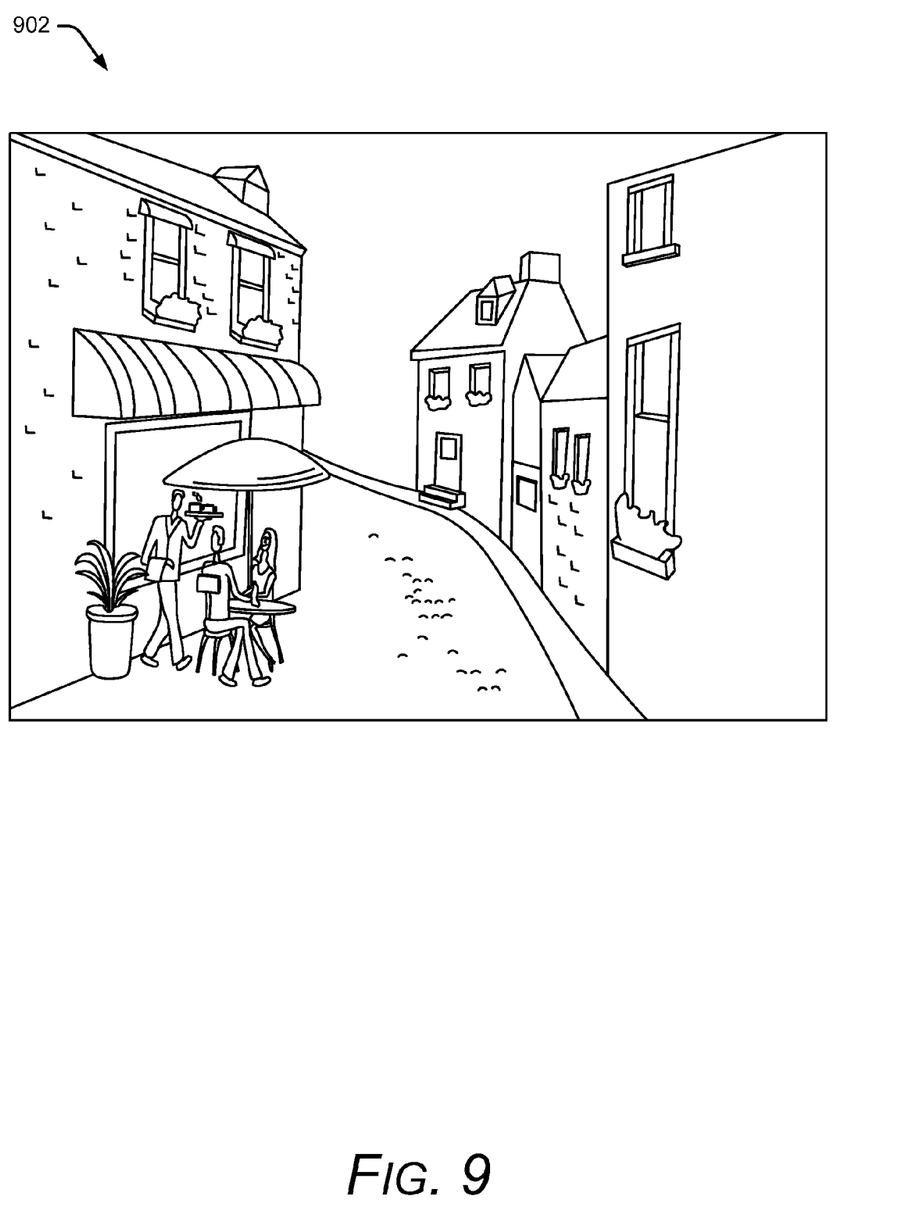
FIG. 9 illustrates an image constructed from light sensed from the scene of FIG. 2.

Concluding the ongoing example, curved circuit 304 and image manager 712 construct image 902, illustrated in FIG. 9, from light sensed from scene 204 of FIG. 2.

Example Electronic Device

Figure 10:
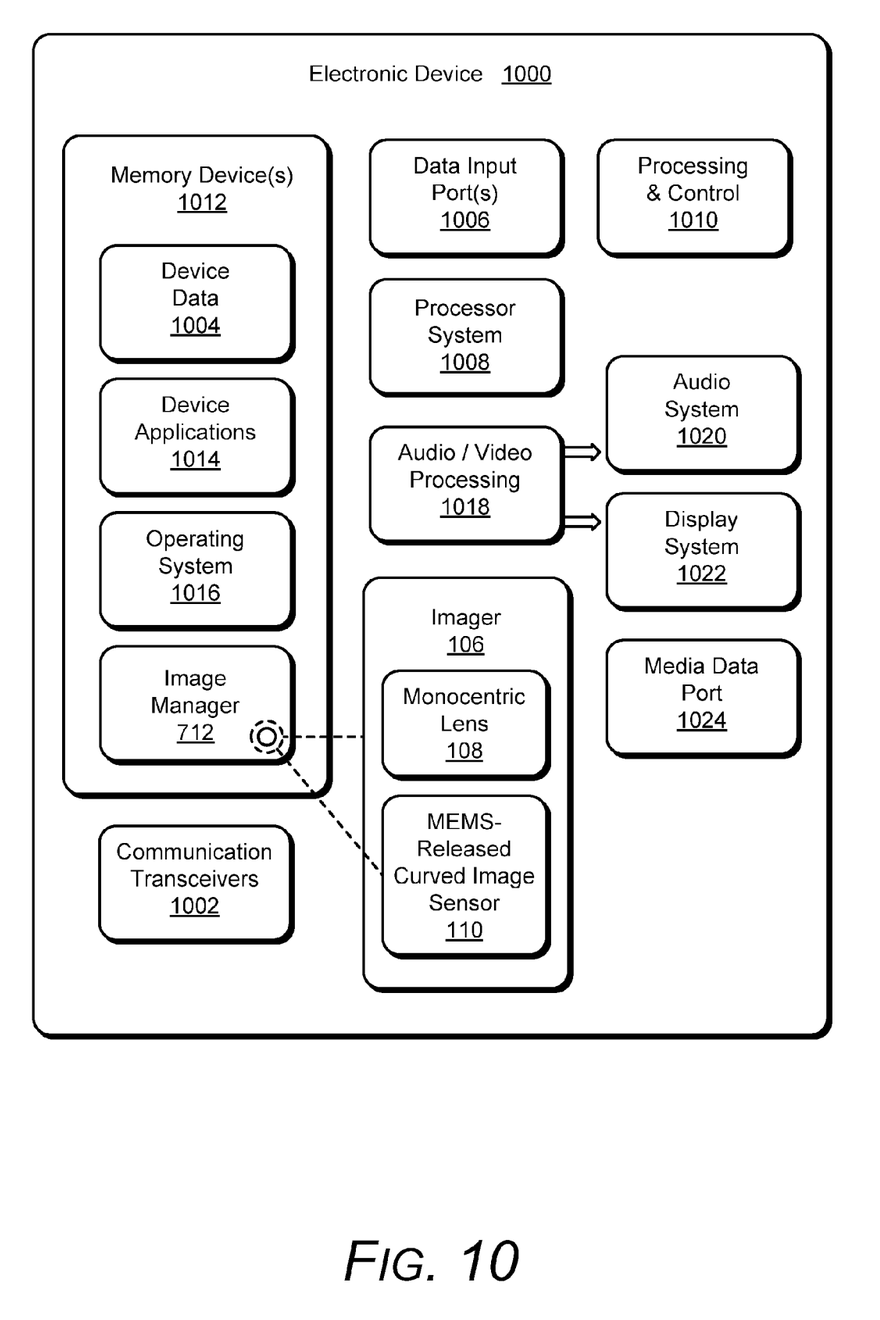
FIG. 10 illustrates various components of an electronic device that can implement a MEMS-released curved image sensor in accordance with one or more embodiments.

FIG. 10 illustrates various components of an example electronic device 1000 that can be implemented as a computing device having an imager as described with reference to any of the previous FIGS. 1-9. Electronic device 1000 may be implemented as any one or combination of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 7.

Electronic device 1000 includes communication transceivers 1002 that enable wired and/or wireless communication of device data 1004, such as received data, transmitted data, or sensor data as described above. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 1000 may also include one or more data input ports 1006 via which any type of data, media content, and/or inputs can be received, such as user-selectable inputs, messages, music, television content, recorded video content, and any other type of audio, video, and/or image data received from any content and/or data source (e.g., other imaging devices). Data input ports 1006 may include USB ports, coaxial cable ports, and other serial or parallel connectors (including internal connectors) for flash memory, DVDs, CDs, and the like. These data input ports may be used to couple the electronic device to components (e.g., imager 106), peripherals, or accessories such as keyboards, microphones, or cameras.

Electronic device 1000 includes processor system 1008 (e.g., any of application processors, microprocessors, digital-signal-processors, controllers, and the like), or a processor and memory system (e.g., implemented in a SoC), which process (i.e., execute) computer-executable instructions to control operation of the device. Processor system 1008 may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware.

Alternatively or in addition, electronic device 1000 can be implemented with any one or combination of software, hardware, firmware, or fixed logic circuitry that is implemented in connection with processing and control circuits, which are generally identified at 1010 (processing and control 1010). Hardware-only devices in which a MEMS-released curved image sensor may be embodied include those that convert, without computer processors, sensor data into voltage signals.

Although not shown, electronic device 1000 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 1000 also includes one or more memory devices 1012 that enable data storage, examples of which include random access memory (RAM), non-volatile memory (e.g., read-only memory (ROM), flash memory, EPROM, EEPROM, etc.), and a disk storage device. Memory device(s) 1012 provide data storage mechanisms to store device data 1004, other types of information and/or data (e.g., image 902), and various device applications 1014 (e.g., software applications). For example, operating system 1016 can be maintained as software instructions within memory device 1012 and executed by processor system 1008. In some aspects, image manager 712 is embodied in memory devices 1012 of electronic device 1000 as executable instructions or code. Although represented as a software implementation, image manager 712 may be implemented as any form of a control application, software application, signal-processing and control module, or hardware or firmware installed on curved circuit 304 of imager 106.

Electronic device 1000 also includes audio and/or video processing system 1018 that processes audio data and/or passes through the audio and video data to audio system 1020 and/or to display system 1022 (e.g., a screen of a smart phone or camera). Audio system 1020 and/or display system 1022 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1024. In some implementations, audio system 1020 and/or display system 1022 are external components to electronic device 1000. Alternatively or additionally, display system 1022 can be an integrated component of the example electronic device, such as part of an integrated touch interface.

Electronic device 1000 includes, or has access to, imager 106, which includes monocentric lens 108 and MEMS-released curved image sensor 110. Sensor data is received from imager 106 and/or MEMS-released curved image sensor 110 by curved circuit 304 and then image manager 712, here shown stored in memory devices 1012, which when executed by processor system 1008 constructs a final image as noted above and shown in FIG. 9.

Although embodiments of a MEMS-released curved image sensor have been described in language specific to features and/or methods, the subject of the appended claims is not necessarily limited to the specific features or methods described. Rather, the specific features and methods are disclosed as example implementations a MEMS-released curved image sensor.

What is claimed is:

1. An imaging device comprising:
    a monocentric lens capable of providing a curved focal surface; and
    a Micro Electrical Mechanical System (MEMS)-released curved image sensor, the MEMS-released curved image sensor having:
    a curved photodetector surface with a released interior, the released interior including etched spaces or furrows spaced as concentric rings centered at a position of the curved photodetector surface in material in which photodetectors of the curved photodetector surface are embodied; and
    a curved circuit physically integral with the curved photodetector surface, the curved photodetector surface being concave and, at the concavity, capable of sensing light of the curved focal surface and providing electric signals in response to sensing the light; and
    the curved circuit capable of receiving the electric signals and providing the electrical signals or data associated with the electric signals effective to enable production of an image associated with the light of the curved focal surface.

2. The imaging device as recited in claim 1, wherein the curved photodetector surface and the curved circuit are integrated within a single silicon wafer.

3. The imaging device as recited in claim 2, wherein the single silicon wafer is a backside-illuminated Complementary Metal-Oxide Semiconductor (CMOS), the curved photodetector surface being on a backside of the backside-illuminated CMOS and the curved circuit being on a front side of the backside-illuminated CMOS opposite the backside.

4. The imaging device as recited in claim 1, wherein the etched spaces or furrows are spaces, the regions that are not etched spaces have the photodetectors and are shaped as polygons, the polygons making up a hemisphere or section of an inverted polyhedron.

5. The imaging device as recited in claim 1, wherein the etched spaces or furrows further comprise radial furrows extending radially from a center of the concavity with a higher density of radial furrows as distance from the center increases.

6. The imaging device as recited in claim 1, wherein the curved photodetector surface includes one or more layers of organic light-sensing material or includes quantum dots or layers of quantum dots configured as photodetectors.

7. The imaging device as recited in claim 1, further comprising a support substrate, the support substrate maintaining the concavity of the curved photodetector surface and including electric vias through which the curved circuit provides the electric signals or the data associated with the electric signals.

8. An imaging device comprising:
    a Micro Electrical Mechanical System (MEMS)-released curved image sensor, the MEMS-released curved image sensor having:
    a curved photodetector surface with a released interior; and
    a curved circuit physically integral with the curved photodetector surface, the curved photodetector surface being concave and, at the concavity, capable of sensing light of the curved focal surface and providing electric signals in response to sensing the light; and the curved circuit capable of receiving the electric signals and providing the electrical signals or data associated with the electric signals effective to enable production of an image associated with the light of the curved focal surface; and
    a monocentric lens capable of providing a curved focal surface, the monocentric lens maintaining the concavity of the curved photodetector surface, the curved photodetector surface surrounding at least a portion of the monocentric lens.

9. The imaging device as recited in claim 1, further comprising:
    one or more computer processors; and
    one or more computer-readable storage media having instructions stored thereon that, responsive to execution by the one or more computer processors, performs operations comprising:
    constructing the image based on the electrical signals or the data associated with the electric signals; and
    providing the image.

10. A method comprising:
    releasing a photodetector side of a computing and sensing silicon wafer, the releasing comprising forming furrows spaced as concentric rings centered at a position of the computing and sensing silicon wafer, photodetectors at the photodetector side capable of sensing light and providing electric signals to the computing and sensing silicon wafer; and
    conforming, at the position, the released photodetector side of the computing and sensing silicon wafer to create a concavity capable of sensing light of a curved focal surface of a monocentric lens through photodetectors at the concavity of the released photodetector side, the conforming producing a curved image sensor capable of receiving the electric signals effective to enable the production of an image associated with the sensed light at the curved focal surface.

11. The method as recited in claim 10, wherein releasing the photodetector side is performed at a micro electrical mechanical system (MEMS) scale.

12. The method as recited in claim 10, wherein releasing the photodetector side includes etching material from the photodetector side.

13. The method as recited in claim 12, wherein the etching creates regions of photodetectors shaped as polygons, the polygons making up a hemisphere or section of an inverted polyhedron when conformed to the concavity.

14. The method as recited in claim 12, wherein the etching further etches radial furrows in the photodetector side, the radial furrows extending radially from a center of the concavity with a higher density of radial furrows as distance from the center increases.

15. The method as recited in claim 12, further comprising fabricating, prior to the releasing, a spring-like material capable of maintaining physical connection between adjacent concentric rings created by the etching through the computing and sensing silicon wafer.

16. The method as recited in claim 12, wherein conforming the released photodetector side of the computing and sensing silicon wafer to create the concavity includes pressing a monocentric lens on the released photodetector side to create the concavity.

17. The method as recited in claim 12, wherein conforming the released photodetector side of the computing and sensing silicon wafer to create the concavity cracks or breaks portions of a computing side opposite the photodetector side.

18. The imaging device as recited in claim 1, wherein the etched spaces or furrows further comprise furrows in material in which the curved circuit is embodied.

19. The imaging device as recited in claim 1, the imaging device further comprising a spring-like material capable of maintaining physical connection between adjacent concentric rings.

20. The method as recited in claim 12, wherein the etching etches furrows in a computing side opposite the photodetector side of the computing and sensing silicon wafer.

* * * * *